Dec. 19, 1950     H. R. RUBENSTEIN     2,534,626
ADJUSTABLE TAIL GATE CONSTRUCTION
Filed Jan. 8, 1948     2 Sheets-Sheet 1
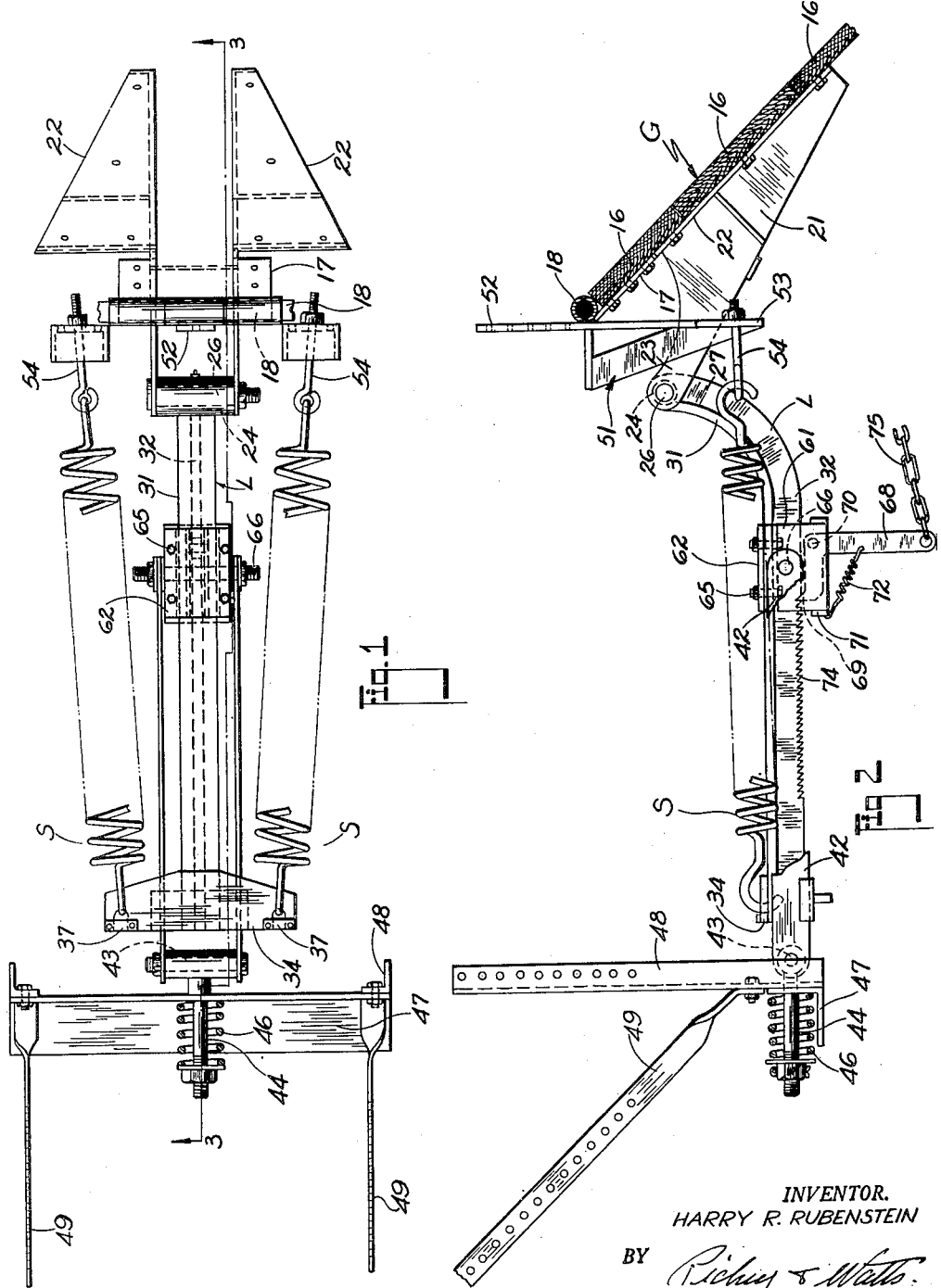
INVENTOR.
HARRY R. RUBENSTEIN
BY
ATTORNEYS Dec. 19, 1950   H. R. RUBENSTEIN   2,534,626
ADJUSTABLE TAIL GATE CONSTRUCTION
Filed Jan. 8, 1948   2 Sheets-Sheet 2
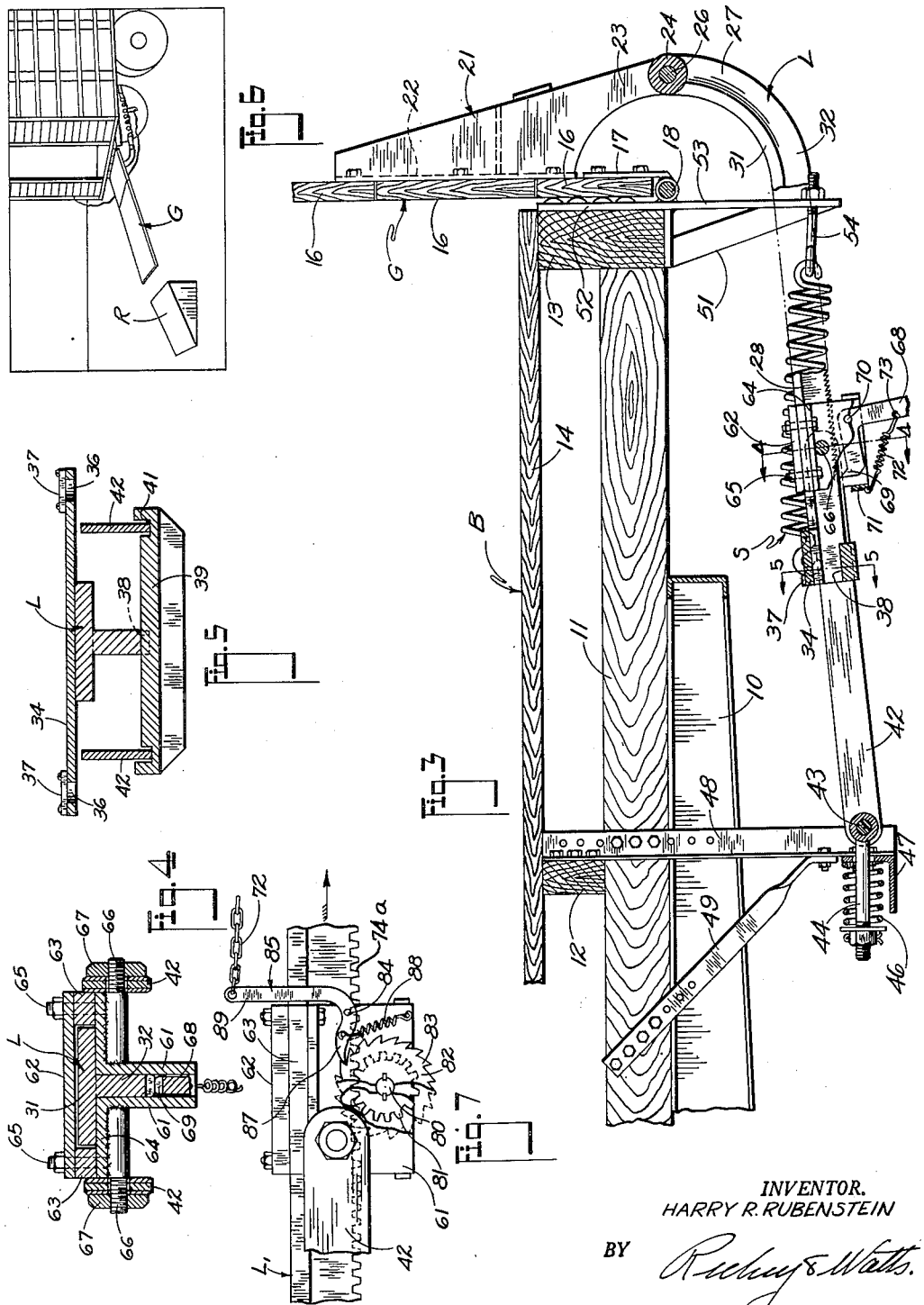
INVENTOR.
HARRY R. RUBENSTEIN
BY Richey & Watts.
ATTORNEYS Patented Dec. 19, 1950

2,534,626

UNITED STATES PATENT OFFICE 2,534,626

ADJUSTABLE TAIL GATE CONSTRUCTION

Harry R. Rubenstein, Euclid, Ohio

Application January 8, 1948, Serial No. 1,133

6 Claims. (Cl. 296—57)

1

This invention relates to tail gate construction for vehicles. Generally speaking, it is an object of the present invention to provide a spring biasing structure for tail gates pivoted along their lower edge which supports the weight of the tail gate during lowering thereof and which includes latch means for causing the tail gate to remain in any selected lowered position. The invention is particularly useful where the tail gate serves as a loading and unloading ramp in that the tail gate can be lowered to a position wherein it is disposed near the ground or to a position wherein it will form a continuation of a loading dock ramp or the like.

It has been proposed to provide tail gates with spring biasing structure which makes them relatively weightless and facilitates their manipulation, and it has also been proposed to provide means for locking the tail gate in a lowered position, such means being in the nature of friction brakes operating in conjunction with pulley and cable assemblies which are not only complicated and expensive to manufacture, but do not provide a positive and dependable lock for the mechanism. Accordingly, it is an object of the present invention to insure with simple and dependable means that the tail gate is positively latched in a selected position against the force of spring means tending to raise the tail gate to its closed or upper position.

Briefly, this object is accomplished by providing a link pivoted to a bracket on the tail gate and extending under the body of the vehicle. Springs anchored to the body urge the link rearwardly and tend to raise or close the gate. Guide links are pivoted to the vehicle body and receive a free end of the aforesaid link. Latch means are carried by the guide links for cooperation with the pivoted link and are arranged so that the latch means freely permit motion of the link that occurs when the gate is lowered, but automatically latches and holds the gate in a selected position when it is released, against the force of the springs tending to raise the gate. Means are provided for manually releasing the latch when it is desired to close the gate.

It is another object of a preferred form to reduce the strain on the latch means by having it act directly on the link pivoted to the gate which provides a strong sturdy construction that cannot bend or twist apart.

An object of a modified form resides in providing a fine control for the latch means even though said means provides a positive and not a friction lock. I accomplish this by a ratchet and pawl assembly driven by a pinion of smaller diameter than the pawl with the pinion meshed with rack teeth cut into the controlling link member.

Another object of a preferred form resides in

2 relieving excessive strains that might be imposed upon the tail gate control mechanism if the vehicle is loaded with the tail gate resting on a solid base. Under these circumstances, as the vehicle springs flex there is a tendency for the gate to pivot relative to the vehicle in a direction tending to raise the gate. Since motion in this direction is prevented by the latch assembly, such action might severely load that assembly. This is prevented in my construction by providing a relief spring in the mounting of my unit that yields under the aforesaid conditions. These and other objects and the manner in which they are attained will be apparent as the following detailed description of a preferred embodiment of my invention proceeds.

In the drawings:

Fig. 1 is a plan view of the gate control mechanism before it is mounted on the vehicle;

Fig. 2 is a side elevation with the gate open;

Fig. 3 is a sectional view taken on 3—3 of Fig. 1 with the gate closed and the mechanism mounted on the vehicle body;

Figs. 4 and 5 are sections taken on 4—4 and 5—5 respectively of Fig. 3;

Fig. 6 is a sketch showing how the gate may be latched and retained in any position as the truck is backed up to a ramp; and, Fig. 7 shows details of a modified form of latch.

A portion of vehicle body B appears in Fig. 3, and although it is understood that the construction of the body is not a feature of the invention, a typical truck platform construction is illustrated as one embodiment of the means whereby the invention may be fitted to the vehicle. The vehicle structure illustrated includes channel frame member 10 of conventional design, longitudinal platform frame members 11 commonly of wooden construction, cross platform frame pieces 12 and 13, and floor 14.

The tail gate shown in the form illustrated is made up of wooden planks 16 fastened together by the usual cleats, not shown, and pivoted to the body by means of a hinge member 17 and transverse hinge pin 18, these parts being arranged in any suitable manner.

In order to mount the tail gate control structure, I provide a pair of brackets 21 having flanges 22 that are bolted or screwed to the tail gate. The brackets 21 have depending ears 23 which are apertured and lie to each side of an eye member 24 that forms part of the pivoted link member L. Pivot bolt 26 or similar device joins the parts. Link L has a curved portion 27 formed so that the remainder of the link extends forwardly and under the body. The link L includes a straight section 28 which cooperates with latch and guiding structure as will be hereinafter described in detail.

I prefer, in the interests of rigidity of constructure, that the link L be made as a T section having a top flange 31 and an upright flange 32. At the terminal portion of link L, crossbar 34 is welded or otherwise secured in place and the bar is apertured at each side as at 36 so that it may form a spring anchor. A pair of main biasing springs S are provided, one end of each being anchored in the apertures 36 there being keeper-plates 37 to positively retain the spring in place. The lower portion of the link L may be relieved as at 38 to receive a crossbar 39 welded in place and having guide portions 41 that receive a pair of guide links 42.

Guide links 42 are pivotally mounted as at 43 to an eye-bolt 44 which may be spring mounted by means of spring 46 on a bracket 47, which provides a yielding mounting as will be hereinafter described. A cross bracket 47 is supported by a pair of strap members 48 and 49, fastened to the vehicle body in any suitable manner. As mentioned before, one end of the spring S of each spring connects to the anchor 34 mounted on the link L. The other end of each spring is anchored to the body by a bracket 51. Each bracket includes a portion 52 bolted to the body frame piece 13 and a depending portion 53 that carries adjustable eye-bolts 54 for connection to the associated spring.

The guide links 42 support the latch assembly which receives and guides link L. A pair of angle plates 61 having upper flanges 64 are provided with studs 66 welded or otherwise fastened in place. Top plate 62 and a spacer block 63 form with the angle plate 61 a channel for guiding and receiving the straight portion of link L. The members are held together by bolts 65. The guide links 42 are clamped against the parts and support the guide by nut 67 on a bolt 66 welded to angle plate 61. Thus, the guiding means is fixed relative to the guide links 42 and slidably receive the link L. In order to latch the tail gate in a selected position, a pawl member 68, having a toothed portion 69, is pivoted between the angle plates 61 by a pin 70. Spring 72 is fastened at one end to a plate 71 welded across angle plates 61 and at the other end to the pawl member as at 73 to urge the tooth 69 against the link L. Link L is formed with a group of rearwardly facing teeth or serrations 74 for cooperation with tooth 69 on the pawl. A line or chain 75 may be provided for extending rearwardly to an accessible position to facilitate releasing the latch mechanism.

In operation when it is desired to open the tail gate, the customary latch means for the tail gate are released and the tail gate is lowered against the force of springs S. I prefer that the springs S be selected and adjusted so that they at all times more than counterbalance the weight of the tail gate. As the gate is lowered, teeth 74 slide past the pawl member because the tooth 69 and the teeth 74 are formed so that the pawl cams over the teeth during this operation. It being remembered that the springs S always tend to raise the gate, it can be seen that after the gate is lowered to the selected position it tends to spring back when it is released. However, the gate is automatically locked in the selected position because although the springs S urge the link L rearwardly, the steeper faces of the teeth 74 are urged against the tooth 69 on the pawl which prevents further rearward motion of the link. Thus, the tail gate automatically remains in the selected position until the line 75 is manipulated, releasing the latch and permitting the springs to raise the gate to its original position.

In practice, the tail gate may be pulled down and locked against a ramp, or, as seen in Fig. 6, the gate G may be lowered and the vehicle backed over a ramp R.

It will be noted that the action of the latch or ratchet means is direct, that is, the latch means directly oppose the force of spring S, there being no torques applied to the latch mechanism. This makes the latch mechanism sturdy and dependable, there being no danger that it will be twisted or forced apart. The pivoted guide members for receiving the link L provide for easy operation and, at the same time, facilitate inclusion of an effective and simple latch mechanism.

The location and arrangement of the parts with respect to the pivot 18 of the tail gate is such that the effective force of the spring first increases and then decreases as the tail gate is lowered. This can be explained as follows: The force of springs S act on pivot 24 in a direction parallel to the straight part of link L. With the gate closed as in Fig. 3, the effective lever arm between 24 and 18 is small. As the gate is lowered the lever arm increases and when the gate is horizontal the lever arm is at its maximum, as is the effect of gravity on the gate. Further lowering of the gate decreases the aforesaid lever arm and hence the effective force of the springs S.

The modified form of latch assembly shown in Fig. 7 has the advantage that it is designed to provide a fine adjustment of the tail gate position. In this form the main link $L_1$ has rack teeth 74a formed therein instead of the ratchet teeth previously described. Mounted between plates 61 and keyed to pin 80 is a pinion 81 meshed with the rack. On one side of a plate 61, and also keyed to pin 80, is a toothed wheel 82 having ratchet teeth 83. A pin 84 mounts the pawl lever 85 formed with a tooth 87 for locking the toothed wheel and pinion. Spring 88 urges the pawl to its locking position. Arm 89 is provided for connection with the operating line 75. As the springs S tend to raise the gate link $L_1$ tends to move in the direction of the arrow. Unless the pawl is released motion in this direction is prevented by the pawl and ratchet assembly. The fact that the toothed wheel has a larger diameter than the pinion magnifies motion of the link $L_1$ at the pawl and provides a fine control without need for small, weak ratchet teeth.

Consideration of the over-all structure of my tail gate mounting assembly in relation to the vehicle will reveal that if the tail gate is lowered until it rests upon the ground or other base, and if the vehicle is then loaded, the vehicle springs flex and the body is lowered which tends to pivot the gate in a direction relative to the vehicle tending to close the gate. This action would severely strain the latch mechanism were it not for spring 46 which yields under these conditions and permits the motion described to occur without unduly straining the parts.

Having completed a detailed description of the preferred embodiment of my invention, I contemplate that various modifications may be made therein without departing from the essence of the invention. Accordingly, I contemplate that the appended claims and not the aforesaid embodiment be determinative of the scope of my invention.

What is claimed is:

1. Latching mechanism for the tail gate of a vehicle body having a gate horizontally hinged adjacent its lower end to the body and being substantially vertical in its closed position, comprising bracket means for attachment to the tail gate, link means pivoted to said bracket means and adapted to extend under the vehicle body, movable spring anchor means mounted on said link means remote from its pivot point, fixed spring anchor means adapted to be mounted on the vehicle bdoy adjacent the pivoted end of said link means, tension spring means extending between said spring anchor means and to the side of said link means said spring means being of sufficient strength to overbalance the weight of said gate, guide means, means for pivotally mounting said guide means under said body and between said spring anchor means, said guide means slidably receiving said link means, and releasable latch means mounted on said guide means and engaging said link means.

2. Latching mechanism for the tail gate of a vehicle body having a gate horizontally hinged adjacent its lower end to the body and being substantially vertical in its closed position, comprising bracket means for attachment to the tail gate, first link means pivoted to said bracket means and adapted to extend under said vehicle body, movable spring anchor means mounted on said first link means remote from its pivot point, fixed spring anchor means adapted to be mounted on the vehicle body adjacent the pivoted end of said first link means, tension spring means extending between said spring anchor means and being of sufficient strength to overbalance the weight of said gate, guide link means, means for pivotally mounting said guide link means under said body parallel and oppositely extending to said first link means, guide means mounted on said guide link means remote from the pivot point thereof for slidably receiving said first link means, and releasable latch means mounted on said guide means and engaging said first link means.

3. Latching mechanism for the tail gate of a vehicle body having a gate horizontally hinged adjacent its lower end to the body and being substantially vertical in its closed position, comprising bracket means for attachment to the tail gate, first link means pivoted to said bracket means and adapted to extend under said vehicle body, movable spring anchor means mounted on said first link means remote from its pivot point, fixed spring anchor means adapted to be mounted on the vehicle body adjacent the pivoted end of said first link means, tension spring means extending between said spring anchor means and being of sufficient strength to overbalance the weight of said gate, guide link means, means for pivotally mounting said guide link means under said body parallel and oppositely extending to said first link means, guide means mounted on said guide link means remote from the pivot point thereof for slidably receiving said first link means, rearwardly facing ratchet teeth formed on said first link means and releasable latch means mounted on said guide means and engaging the teeth of said first link means.

4. Latching mechanism for the tail gate of a vehicle body having a gate horizontally hinged adjacent its lower end to the body and being substantially vertical in its closed position, comprising bracket means for attachment to the tail gate, link means pivoted to said bracket means and adapted to extend under said vehicle body, movable spring anchor means mounted on said link means remote from its pivot point, fixed spring anchor means adapted to be mounted on the vehicle body adjacent the pivoted end of said link means, tension spring means extending between said spring anchor means and being of sufficient strength to overbalance the weight of said gate, guide means, means for mounting said guide means under said body and between said spring anchors for pivotal motion, said guide means slidably receiving said link means, and releasable latch means mounted on said guide means and engaging said link means, said guide means mounting including means for permitting rearward motion of said guide means and spring means for resiliently opposing said motion.

5. In combination with a vehicle body, a tail gate horizontally hinged adjacent its lower end to the body, bracket means attached to said tail gate, link means pivoted to said bracket means and extending under said vehicle body, spring means connected to said gate and to said body and tending to close said gate, said spring means being of sufficient strength to overbalance the weight of said gate, latch means, means mounting said latch means on said body with said latch means engaging said link means, said mounting means including a portion movable rearwardly and supporting said latch means and a spring engaging said movable portion and said body and arranged to oppose rearward motion of said latch mounting means and the latch means carried thereby, said latch means being constructed to ride over said link means upon downward motion of said gate, said latch means being constructed to hold said link means and automatically prevent upward motion of said gate as said spring means tend to raise said gate, and means for releasing said latch means to permit said spring means to raise the gate.

6. Mounting mechanism for the tail gate of a vehicle body, comprising bracket means for attachment to the tail gate, link means pivoted to said bracket means and adapted for extending under the vehicle body, rack teeth on said link means, spring means connected to means movable with said gate and to means adapted to be fixed to said body and tending to close said gate, said spring means being of sufficient strength to overbalance the weight of said gate, latch means comprising a pinion keyed to a ratchet wheel of larger diameter and a pawl engaging said ratchet wheel, means for mounting said latch means on said body with said pinion engaging said rack teeth on the link means, said latch means being constructed so that the pawl rides over the ratchet wheel upon opening motion of the gate, said pawl and ratchet wheel being constructed to hold said pinion and link means and automatically prevent closing motion of the gate, and means for releasing said pawl to permit said spring means to close the gate.

HARRY R. RUBENSTEIN.

REFERENCES CITED

The following references are of record in the file of this patent:

UNITED STATES PATENTS

| Number | Name | Date |
| --- | --- | --- |
| 1,592,879 | Yirava | July 20, 1926 |
| 1,595,555 | Kooser | Aug. 10, 1926 |
| 1,711,282 | Orr | Apr. 30, 1929 |
| 2,151,335 | Rush | Mar. 21, 1939 |
| 2,261,099 | Fairbanks | Oct. 28, 1941 |
| 2,328,082 | Lawrence | Aug. 31, 1943 |
| 2,388,075 | Peters | Oct. 30, 1945 |